UNITED STATES PATENT OFFICE.

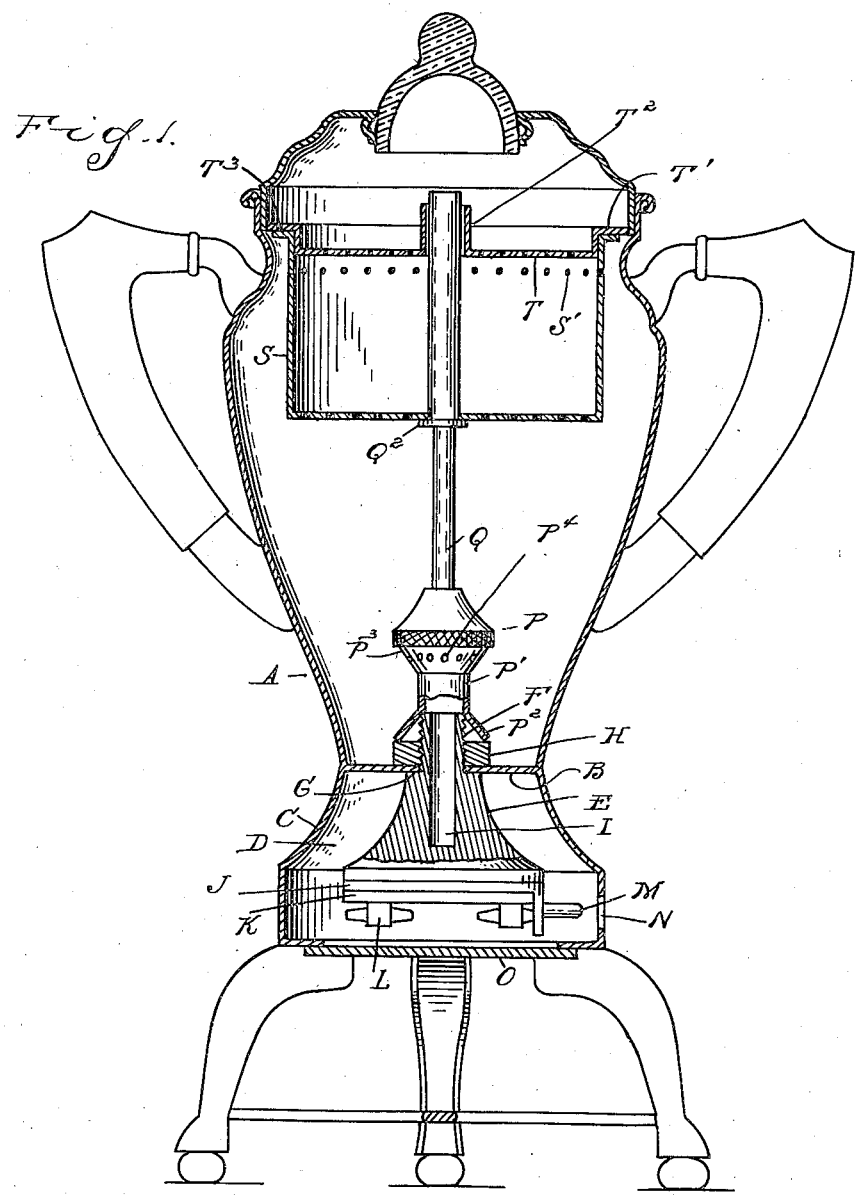

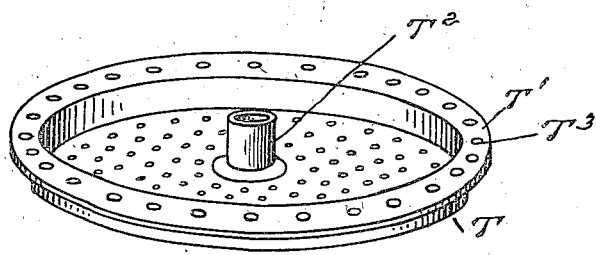
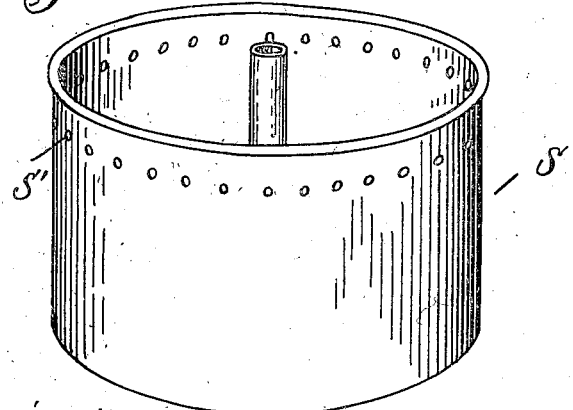
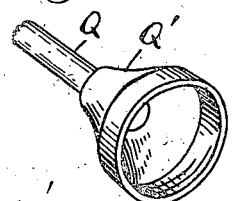
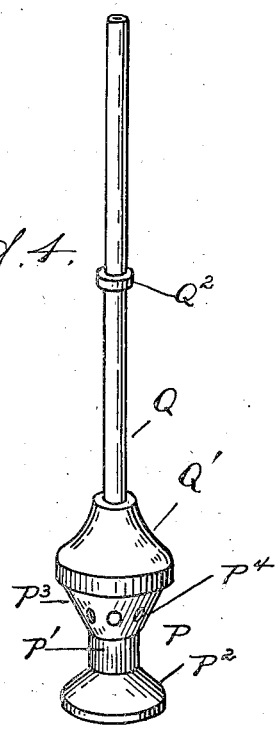
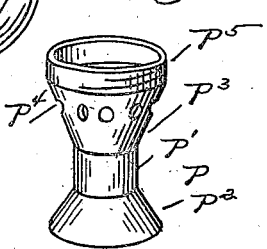

FRANK KUHN AND FRANK E. SHAILOR, OF DETROIT, MICHIGAN, ASSIGNORS TO AMERICAN ELECTRICAL HEATER COMPANY, OF DETROIT, MICHIGAN, A CORPORATION OF MICHIGAN.

COFFEE-PERCOLATOR.

1,276,774.  Specification of Letters Patent.  Patented Aug. 27, 1918.

Application filed April 19, 1915. Serial No. 22,406.

*To all whom it may concern:*

Be it known that we, FRANK KUHN and FRANK E. SHAILOR, citizens of the United States of America, residing at Detroit, in the county of Wayne and State of Michigan, have invented certain new and useful Improvements in Coffee-Percolators, of which the following is a specification, reference being had therein to the accompanying drawings.

The invention relates to percolators and more particularly to that type which are provided with electric heaters. The invention comprises various features of construction as hereinafter set forth.

In the drawings:

Figure 1 is a vertical central section through the percolator;

Figs. 2, 3 and 4 are perspective views of the perforated holder, the cover therefor and the font detached; and Figs. 5, 6 and 7 are perspective views of the detached parts forming the font.

In the construction of a percolator it is desirable to concentrate the heat in the hot-well and to maintain the desired temperature with the minimum heat generation. It is also desirable to protect the heating unit from injury, such as might occur by the spilling of coffee or other liquid upon the same. This is accomplished in the present construction by forming the vessel A with a relatively small bottom B, and providing a continuous flaring skirt C forming a chamber D for holding the heating unit and hot-well. The hot-well is formed in a metallic member E having a flat base of sufficient area for the unit, and tapering upward to form a threaded stud F with a shoulder G locked against the bottom by a clamping nut H engaging the threads of the stud. Within the member C is the central well or chamber I in which the liquid is vaporized, and as the only connection to the vessel is the restricted contact with the bottom thereof, practically all of the heat will be conserved. J is the disk heating unit clamped to the flat base of the member E by a clamping plate K and winged studs L, these being arranged within the space inclosed by the skirt. M are the terminal contacts projecting laterally from the disk unit and registering with an aperture N in the skirt, through which the conductor plug may be inserted.

O is a bottom plate beneath the unit for intercepting downward radiation.

The percolator comprises a font, which as shown in Figs. 4 to 6 forms an unobstructed tube leading from the hot-well to a point above the perforated receptacle. The lower portion of this tube is formed by a member P having a cylindrical portion P', a flaring base flange $P^2$ and a flaring upwardly-extending flange $P^3$ having an annular series of perforations $P^4$ and above the latter a threaded portion $P^5$. The upper portion of the font is formed by a tube Q having at its lower end a conical cap Q' internally threaded for engagement with the threaded portion $P^5$ of the member P. When the members P and Q are engaged with each other they form, as above stated, an unobstructed tube, with an enlarged chamber therein, having a conical perforated bottom and a conical top, while the flaring skirt $P^2$ forms a guide for centering the tube over the upwardly-projecting end of the hot-well E. R is a conical annular valve member for fitting within the member P and seating against the conical flange $P^3$ to close the apertures $P^4$. The whole construction is such that in operation the liquid column raised by the steam generated in the hot well will find no obstruction to its upward movement, while the rising of the conical valve R will open the apertures $P^4$, permitting ingress of liquid from the surrounding chamber. This liquid will be deflected downward by the conical form of the valve so as to refill the hot-well, but the valve itself will not at any time obstruct the central passage of the tube.

The perforated receptacle S which contains the coffee is preferably supported upon a shoulder $Q^2$ on the tube Q, and is provided with a perforated cover T. This cover is formed with an outwardly-extending flange T' resting upon the upper edge of the receptacle S and with a central guide tube $T^2$ which is sleeved upon the upper end of the tube Q and rises to a greater height than the flange T'. It frequently happens in the operation of the percolator that the quantity of liquid which is raised by the font is greater than can percolate through the coffee, so that there is danger of overflowing the receptacle. To return the surplus liquid the flange T' is provided with a series of apertures T³ preferably larger than the perforations in the receptacle, so as to permit the overflowing liquid to pass therethrough. There is also preferably provided within the receptacle S and just below the cover T a series of perforations S'. These, together with the perforations T³, will avoid all danger of abnormal rise in the height of the liquid. The peripheral wall of the receptacle S is preferably imperforate with the exception of the series of perforations S', so that all of the liquid will be compelled to pass through the entire body of coffee instead of partly passing out at the sides.

By reason of the various features of construction as above set forth, the device in operation will have an increased efficiency, while the construction which permits of separating the various parts facilitates the cleansing of the same.

What we claim as our invention is:—

1. In a percolator, the combination with a receptacle for the granular material having a perforated bottom and substantially imperforate side walls, of a perforated top for said receptacle having an outwardly-extending flange provided with enlarged perforations for drainage of the overflow.

2. In a percolator, the combination with a receptacle for the granular material, having a perforated bottom and side walls imperforate in their lower portion, having a series of drain perforations near the top, a perforated cover for said receptacle fitting within the same, and an outwardly-extending flange upon said cover having a series of drain apertures therein.

3. In a percolator, the combination with a receptacle for the liquid having a hot-well in the bottom thereof, of a font comprising a tube with the lower end thereof registering with said hot-well, a receptacle for the granular material sleeved upon said tube and seated on a shoulder thereon, the bottom of said receptacle being perforated and the side walls being imperforate in the lower portion thereof, and a perforated cover for said receptacle having an outwardly-extending flange perforated to form overflow drain apertures.

In testimony whereof we affix our signatures in presence of two witnesses.

FRANK KUHN.
FRANK E. SHAILOR.

Witnesses:
OSCAR ECKLOFF,
HARRY W. LUYEKX.